US009481343B2

(12) United States Patent
Oslizlo et al.

(10) Patent No.: US 9,481,343 B2
(45) Date of Patent: Nov. 1, 2016

(54) WINDSCREEN WIPER DEVICE

(71) Applicant: Federal-Mogul Corporation, Southfield, MI (US)

(72) Inventors: Michael Oslizlo, Milan, MI (US); Dennis E. Cox, Belleville, MI (US)

(73) Assignee: Federal-Mogul Corporation, Southfield, MI (US)

( * ) Notice: Subject to any disclaimer, the term of this patent is extended or adjusted under 35 U.S.C. 154(b) by 114 days.

(21) Appl. No.: 13/713,173

(22) Filed: Dec. 13, 2012

(65) Prior Publication Data
US 2013/0152329 A1 Jun. 20, 2013

Related U.S. Application Data

(60) Provisional application No. 61/570,563, filed on Dec. 14, 2011.

(51) Int. Cl.
*B60S 1/38* (2006.01)
*B60S 1/40* (2006.01)
*B60S 1/32* (2006.01)

(52) U.S. Cl.
CPC .. B60S 1/40 (2013.01); B60S 1/32 (2013.01); B60S 1/38 (2013.01); B60S 1/3801 (2013.01); B60S 1/3806 (2013.01); B60S 1/3879 (2013.01); B60S 1/3886 (2013.01); *B60S 2001/382* (2013.01); *B60S 2001/3813* (2013.01); *B60S 2001/3843* (2013.01); *Y10T 29/49826* (2015.01)

(58) Field of Classification Search
CPC ............... B60S 1/3801; B60S 1/3806; B60S 2001/3813; B60S 2001/3843; B60S 2001/382; B60S 1/3886–1/3896

USPC .......... 15/250.44–250.48, 250.201, 250.361, 15/250.32
See application file for complete search history.

(56) References Cited

U.S. PATENT DOCUMENTS 2,767,419 A * 10/1956 Horton .................... 15/250.451
2,907,065 A * 10/1959 Macpherson ............ 15/250.453
2,955,313 A * 10/1960 Anderson .................. 15/250.47

(Continued)

FOREIGN PATENT DOCUMENTS

CA          1180515 A        1/1985
CN          1647980 A        8/2005

(Continued)

OTHER PUBLICATIONS

"Trico Teflon Shield", http://www.tricoproducts.com/Trade/WiperProducts/BeamBlades/TeflonShield; Dec. 12, 2012.

(Continued)

*Primary Examiner* — Monica Carter
*Assistant Examiner* — Andrew A Horton
(74) *Attorney, Agent, or Firm* — Robert L. Stearns; Dickinson Wright, PLLC

(57) ABSTRACT

A windscreen wiper device is provided. The windscreen wiper device includes an elongated wiper strip of a flexible material for sealing against the windshield and at least one elongated groove. At least one flexible and elongated carrier element is disposed in the at least one groove of the wiper strip for biasing the wiper strip into a predetermined configuration when in a relaxed state. The at least one carrier element presents at least one upwardly facing curve and at least one downwardly facing curve when in a relaxed state.

3 Claims, 4 Drawing Sheets

(56) References Cited

U.S. PATENT DOCUMENTS

| | | | | |
|---|---|---|---|---|
| 3,018,500 A | * | 1/1962 | Anderson | 15/250.453 |
| 3,192,551 A | | 7/1965 | Appel | |
| 3,234,578 A | * | 2/1966 | Leo Golub et al. | 15/250.201 |
| 3,317,946 A | * | 5/1967 | Anderson | 15/250.201 |
| 3,350,738 A | * | 11/1967 | Anderson | 15/250.201 |
| 4,028,770 A | | 6/1977 | Appel | |
| 4,336,625 A | * | 6/1982 | Maiocco | 15/250.451 |
| 4,343,063 A | * | 8/1982 | Batt | 15/250.451 |
| 4,807,326 A | | 2/1989 | Arai et al. | |
| 5,048,145 A | | 9/1991 | Takahashi et al. | |
| 5,257,436 A | | 11/1993 | Yang | |
| 5,325,563 A | | 7/1994 | Cayan | |
| 5,383,249 A | * | 1/1995 | Yang | 15/250.201 |
| 5,463,790 A | * | 11/1995 | Chiou et al. | 15/250.201 |
| 6,000,093 A | * | 12/1999 | Charng | 15/250.201 |
| 6,038,730 A | | 3/2000 | Chen | |
| 6,119,302 A | * | 9/2000 | Egner-Walter et al. | 15/250.44 |
| 7,373,688 B2 | | 5/2008 | Aoyama et al. | |
| 7,526,832 B2 | | 5/2009 | Matsumoto et al. | |
| 7,603,742 B2 | | 10/2009 | Nakano et al. | |
| 7,636,980 B2 | | 12/2009 | Nakano | |
| 7,775,337 B2 | | 8/2010 | Moshenrose et al. | |
| 7,836,541 B2 | | 11/2010 | Harita et al. | |
| 7,921,503 B1 | | 4/2011 | Chiang | |
| 8,015,656 B2 | | 9/2011 | Fujiwara et al. | |
| 8,151,406 B2 | | 4/2012 | Machida et al. | |
| 8,181,308 B2 | | 5/2012 | Kwon et al. | |
| 2007/0017055 A1 | | 1/2007 | Simko | |
| 2008/0028564 A1 | | 2/2008 | Ku | |
| 2008/0098559 A1 | | 5/2008 | Machida et al. | |
| 2008/0134456 A1 | | 6/2008 | Choi | |
| 2008/0155776 A1 | | 7/2008 | Harita | |
| 2009/0044365 A1 | | 2/2009 | Koppen et al. | |
| 2009/0113653 A1 | | 5/2009 | Thienard | |
| 2010/0139027 A1 | | 6/2010 | An et al. | |
| 2010/0293738 A1 | | 11/2010 | Kim et al. | |
| 2011/0041280 A1 | | 2/2011 | Choi et al. | |
| 2011/0056041 A1 | | 3/2011 | Wu | |
| 2011/0131750 A1 | | 6/2011 | Kwon et al. | |
| 2011/0162161 A1 | | 7/2011 | Amado | |
| 2011/0162162 A1 | | 7/2011 | Fujiwara et al. | |
| 2011/0258802 A1 | | 10/2011 | Op'T Roodt et al. | |
| 2011/0265309 A1 | | 11/2011 | Koppen et al. | |
| 2013/0133152 A1 | | 5/2013 | Op'T Roodt et al. | |

FOREIGN PATENT DOCUMENTS

| | | | | |
|---|---|---|---|---|
| CN | 101456407 A | | 6/2009 | |
| CN | 201357813 Y | | 12/2009 | |
| CN | 101654893 A | | 6/2010 | |
| CN | 101890919 A | | 11/2010 | |
| CN | 101959726 A | | 1/2011 | |
| CN | 101977800 A | | 2/2011 | |
| CN | 101992747 A | | 3/2011 | |
| CN | 102131682 A | | 7/2011 | |
| DE | 202006004273 U1 | | 5/2006 | |
| DE | 202011100429 U1 | | 9/2011 | |
| EP | 2105362 A1 | | 9/2009 | |
| EP | 2338747 A2 | | 6/2011 | |
| FR | 2403243 A1 | | 4/1979 | |
| FR | 2781741 A1 | | 2/2000 | |
| FR | 2847311 A1 | | 5/2004 | |
| GB | 2103075 A | * | 2/1983 | B60S 1/38 |
| GB | 2234670 A | * | 2/1991 | B60S 1/38 |
| JP | s38553 B | | 1/1963 | |
| JP | S5836748 A | | 3/1983 | |
| JP | 0236061 A2 | | 9/1987 | |
| JP | S62270808 A | | 11/1987 | |
| JP | H09164916 A | | 6/1997 | |
| JP | 2006117116 A | | 5/2006 | |
| JP | 2011116365 A | | 6/2011 | |
| JP | 2011251567 A | | 12/2011 | |
| WO | 2006051722 A1 | | 5/2006 | |
| WO | 2007091397 A1 | | 8/2007 | |
| WO | 2011152507 A1 | | 12/2011 | |

OTHER PUBLICATIONS

"Denso Designer Blade", http://www.densoaftermarket.com/wiperblades.php; Dec. 12, 2012.

* cited by examiner

WINDSCREEN WIPER DEVICE

CROSS REFERENCE TO RELATED APPLICATION

This application claims the benefit of application Ser. No. 61/570,563, filed Dec. 14, 2011, the entire contents of which is hereby incorporated by reference.

BACKGROUND OF THE INVENTION

1. Field of the Invention

The present invention is related generally to windscreen wiper devices and more particularly to carrier elements for windscreen wiper devices.

2. Related Art

The majority of automotive windscreen wiper devices, or wiper blades, can be categorized as either conventional-style wiper blades (hereinafter referred to as "conventional blades") or beam-style wiper blades (hereinafter referred to as "beam blades"). Conventional blades typically include an elongated wiper strip; at least one carrier element (also known as a flexor); and a frame structure with a connecting device for attachment to a wiper arm, a plurality of linkages and a plurality of claws. The carrier elements are generally linearly shaped when in a relaxed state, and the frame structure distributes a force from a wiper arm across the lengths of the carrier elements and the wiper strip while allowing the carrier elements and wiper strip to flex and conform to the curvature of a vehicle's windshield. This establishes a seal between the wiper strip and the windshield.

Beam blades, in contrast to conventional blades, lack a frame structure. Instead, the carrier elements of beam blades are curved when in a relaxed state and the connecting device is attached directly to the carrier element or elements. When a beam blade is pressed against a windshield, the curved carrier elements conform the wiper strip to the curvature of the windshield and press substantially the entire length of the wiper strip against the windshield to establish the seal between the wiper strip and the windshield. Beam blades also typically include one or more spoiler elements, which use a flow of air over the beam blade to apply a down force on the carrier elements and the wiper strip while the vehicle is in motion to further press the wiper strip against the windshield.

Conventional and beam blades may not always exhibit a uniform pressure distribution against the windshield across the length of the wiper strip. For example, the wiper strips of some conventional blades exhibit areas of increased force, or pressure points, against the windshield at the locations of the claws, which may lead to streaky wiping of the windshield. On the other hand, the end areas of beam blade wiper strips may not always be pressed as strongly against the windshield as the middle areas, which may lead to uneven wiping of the windshield.

SUMMARY OF THE INVENTION

One aspect of the present invention provides for a windscreen wiper device, or a wiper blade, which exhibits an improved pressure distribution against the windshield across the length of the wiper strip to provide for improved wipe quality. The windscreen wiper device includes an elongated wiper strip of a flexible material for sealing against the windshield and having at least one elongated groove. At least one flexible and elongated carrier element is disposed in the groove of the wiper strip for biasing the wiper strip into a predetermined configuration when in a relaxed state. The at least one carrier element presents at least one upwardly facing curve and at least one downwardly facing curve when in a relaxed state.

According to another aspect of the present invention, the at least one carrier element presents a pair of downwardly facing curves separated from one another by an upwardly facing curve such that it is generally M-shaped when in the relaxed state.

According to yet another aspect of the present invention, the windscreen wiper device includes a frame structure including at least two sets of claws in engagement with the at least one carrier element and at least one set of claws is in engagement with the carrier element between the upwardly facing curve and the downwardly facing curves.

Another aspect of the present invention provides for a method of making a windscreen wiper device including the step of preparing at least one flexible and elongated carrier element. The method continues with the step of plastically deforming the at least one carrier element to give it at least one upwardly facing curve when in a relaxed state. The method proceeds with plastically deforming the at least one carrier element to give it at least one downwardly facing curve when in the relaxed state.

According to another aspect of the invention, the steps of plastically deforming the at least one carrier element are performed by a roller assembly including a plurality of rollers with variable biasing against the carrier element.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
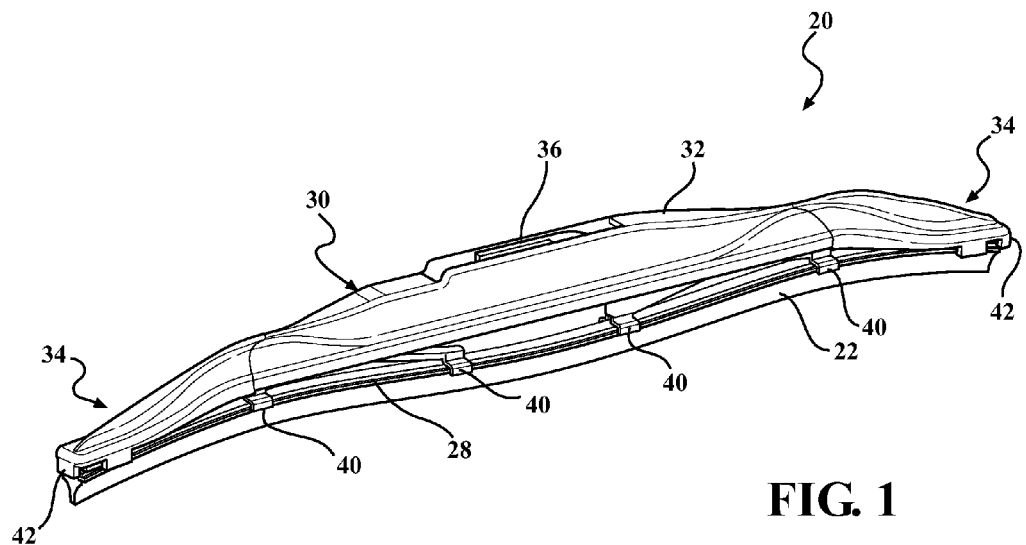
FIG. 1 is a perspective and elevation view of an exemplary wiper blade assembly.
Figure 3:
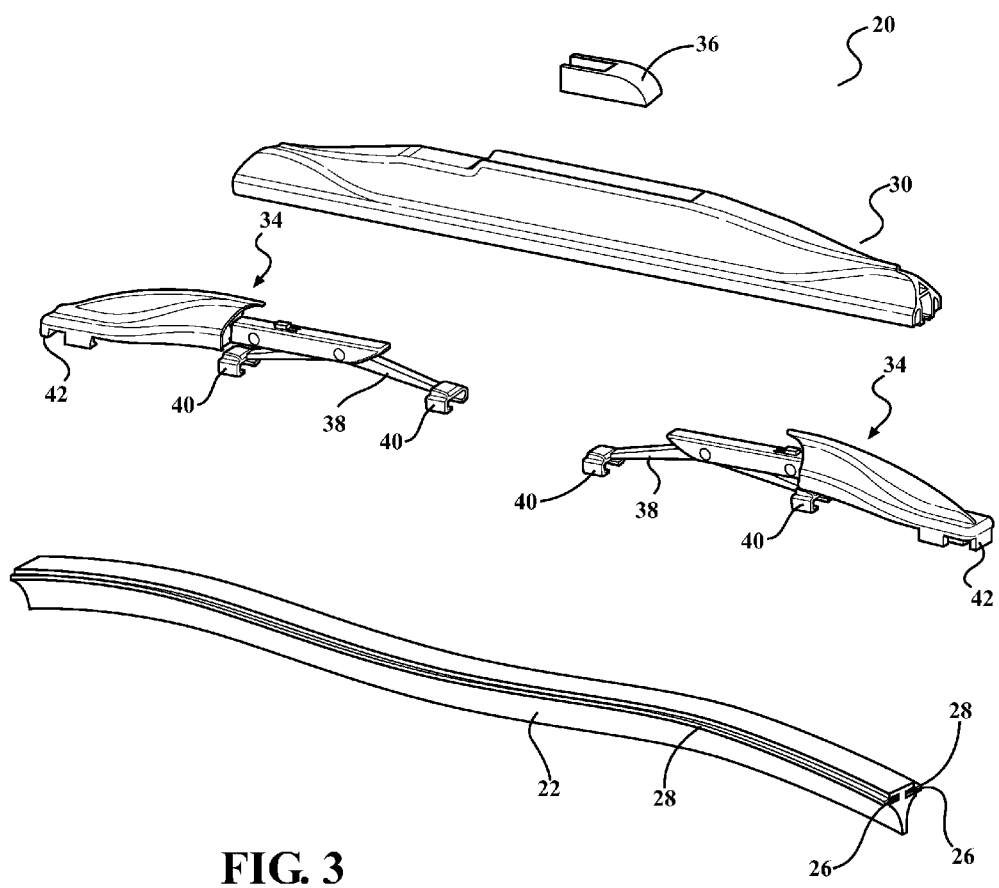
FIG. 3 is a perspective and partially exploded view of the wiper blade assembly of FIG. 1.
Figure 5A:
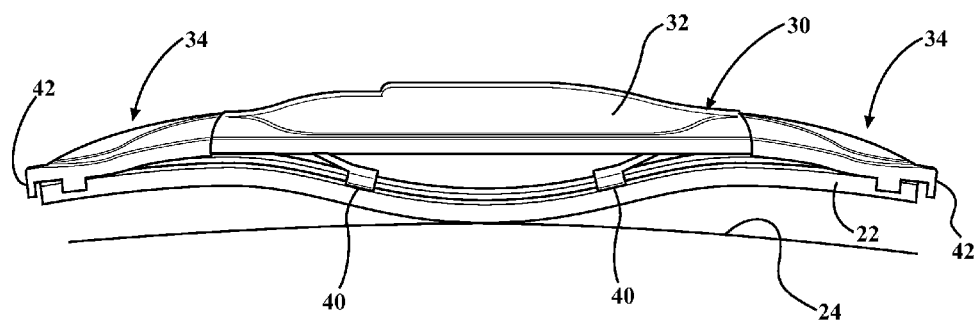
FIG. 5a is a front view showing the lower-most portion of the wiper blade assembly of FIG. 1 in engagement with a windshield.

Referring to the Figures, wherein like numerals indicate corresponding parts throughout the several views, an exemplary embodiment of a hybrid windscreen wiper device, or a hybrid wiper blade assembly 20, is generally shown in FIG. 1. The exemplary wiper blade assembly 20 includes a wiper strip 22 of a flexible and resilient material, such as rubber, for sealing against a vehicle's windshield 24 (shown in FIG. 5) and for driving rain, snow, ice or other elements away therefrom. Referring now to FIG. 3, the exemplary wiper strip 22 includes a pair of oppositely facing grooves 26 that extend substantially the entire longitudinal length of the wiper strip 22. A pair of carrier elements 28 (also known as flexors) are disposed in the grooves 26 to bias the wiper strip 22 into a predetermined configuration. The carrier elements 28 are formed of a flexible and spring-like material, such as spring steel. The carrier elements 28 are preferably either entirely slidably disposed within the grooves 26 or only locked into engagement with the wiper strip 22 at only one location such that the remaining portions of the wiper strip 22 may slide axially relative to the carrier elements 28 in a lengthwise direction. Either of these configurations has the effect of relieving stresses internal to the wiper strip 22 when it is bent to conform to the curvature of a windshield 24 to improve the wipe quality and durability of the wiper blade assembly 20.

The exemplary wiper blade assembly 20 also includes a frame structure 30 which is coupled to the carrier elements 28 and is configured for attachment to a wiper arm (not shown). As best shown in the partially exploded view of FIG. 3, the exemplary frame structure 30 includes a main bridge 32 and a pair of end piece sub-assemblies 34 configured for attachment to opposite ends of the main bridge 32. A connecting device 36 is disposed in a generally central location of the main bridge 32 and is configured for attachment to an end of the wiper arm. It should be appreciated that the connecting device 36 could be of a range of different designs for attaching with different types of wiper arms, e.g. hook-shaped wiper arms, pin-style wiper arms, top lock-style wiper arms, bayonet-style wiper arms, etc. Each of the end piece sub-assemblies 34 includes a linkage 38 with two sets of claws 40 spaced apart from one another. The claws 40 of the exemplary frame structure 30 are in sliding (i.e., non-fixed) engagement with the exemplary carrier elements 28, thereby allowing the carrier elements 28 and the wiper strip 22 to slide in a lengthwise direction relative to the frame structure 30. This feature improves the wipe quality and durability of the wiper blade assembly 20 by reducing the occurrence of internal stresses within the carrier elements 28 and the wiper strip 22 when these components are bent to conform with the curvature of a windshield 24. When the exemplary wiper blade assembly 20 is placed against a windshield 24 of a vehicle, these components on a vehicle, the frame structure 30 transfers a force from the wiper arm to the carrier elements 28 and then to the wiper strip 22, thereby pressing the wiper strip 22 against the windshield 24 and establishing a sealing relationship therebetween.

Referring back to FIG. 1, the end piece sub-assemblies 34 also include end caps with downwardly extending flange portions 42 positioned adjacent the ends of the wiper strip 22 and the carrier elements 28. Together, the flange portions 42 define stopping points for limiting the movement of the wiper strip 22 and the carrier elements 28 relative to the frame structure 30. In other words, the carrier elements 28 and wiper strip 22 may only slide relative to the frame structure 30 within predetermined confines established by the flange portions 42 of the end piece sub-assemblies 34. Each of the end piece sub-assemblies 34 includes a resilient tongue with a button which is snappingly engagable with the main bridge 32 to interconnect the end piece sub-assembly 34 with the main bridge 32. The end piece sub-assemblies 34 are connectable together as a unit independent of the main bridge 32 and of the carrier element 28.

Referring still to FIG. 1, the exterior surface of the main bridge 32 and the end piece sub-assemblies 34 of the exemplary frame structure 30 all have a spoiler shape for creating a down-force when the vehicle is travelling at speeds to increase the pressure of the wiper strip 22 against the vehicle's windshield 24 and improve the seal between the wiper strip 22 and the windshield 24. This has the effect of improving the wipe quality of the exemplary wiper blade assembly 20 when the vehicle is travelling at speeds.

Figure 2:
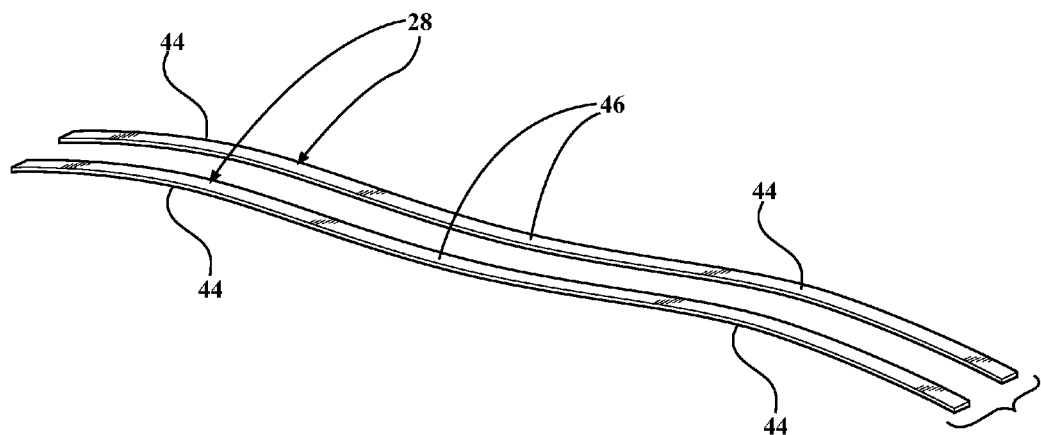
FIG. 2 is a perspective and elevation view of a pair of flexors from the exemplary wiper blade assembly shown in FIG. 1.

Turning now to FIG. 2, the exemplary carrier elements 28 are pre-shaped before they are inserted into the grooves 26 of the wiper strip 22. Specifically, each of the exemplary carrier elements 28 is pre-shaped to present an M-shape with a pair of downwardly facing curves 44 separated from one another by an upwardly facing curve 46 when it is in a relaxed, unstressed state.

Figure 4:
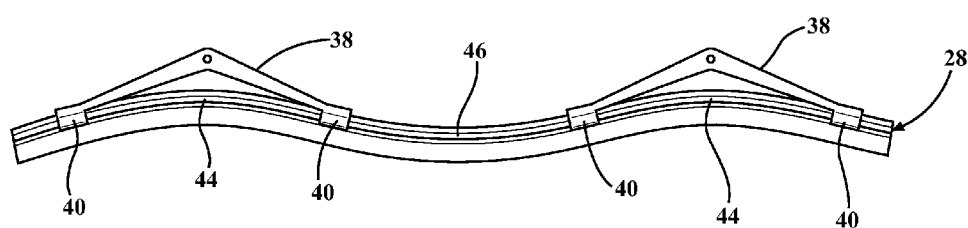
FIG. 4 is a front elevation view of a pair of linkages in engagement with a carrier element in a relaxed state.
Figure 5B:
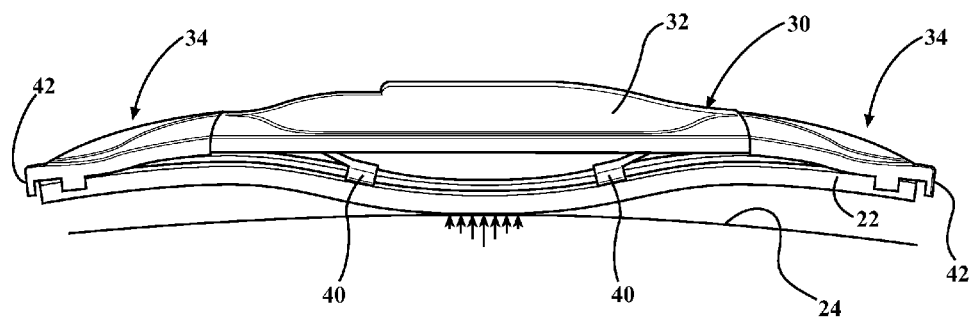
FIG. 5b shows the wiper blade assembly being slightly pressed against the windshield.
Figure 5C:
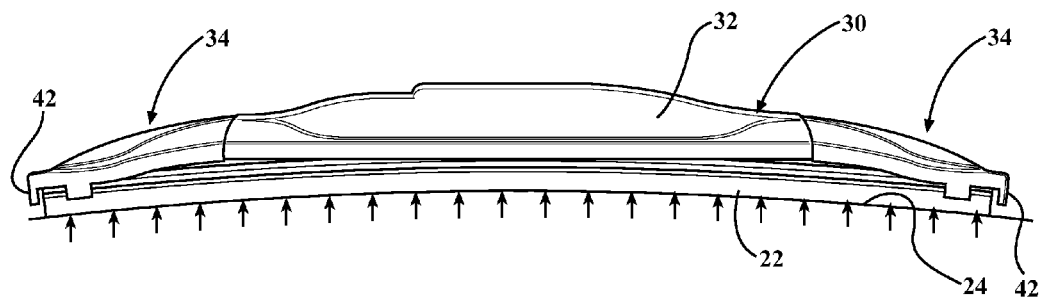
FIG. 5c shows the wiper blade assembly pressed against the windshield in a ready to wipe position.

Referring now to FIG. 4, two of the sets of claws 40 are in engagement with the carrier elements 28 approximately at the locations where the carrier elements 28 transition between the downwardly facing curves 44 and the upwardly facing curve 46. When the wiper blade assembly 20 is placed against a windshield 24, this particular configuration has been found to provide the most evenly distributed pressure gradient along the length of the wiper strip 22. For example, referring now to FIG. 5A, the exemplary wiper blade assembly 20 is shown with only the lower-most portion of the wiper strip 22 being in contact with the windshield 24. FIG. 5B then shows how the wiper strip 22 flattens out as the wiper blade assembly 20 is urged against the windshield 24 by the wiper arm. Locating sets of claws 40 at the transition areas between the downwardly facing curves 44 and the upwardly facing curve 46 encourages and facilitates this flattening. FIG. 5C now shows the exemplary wiper blade assembly 20 in a ready-to-wipe configuration. As can be seen, the pressure at which the wiper strip 22 is urged against the windshield 24 is generally uniformly distributed along the length of the exemplary wiper blade assembly 20. This allows for a substantially streak-free and generally consistent wipe as compared to other known wiper blade assemblies.

Figure 6:
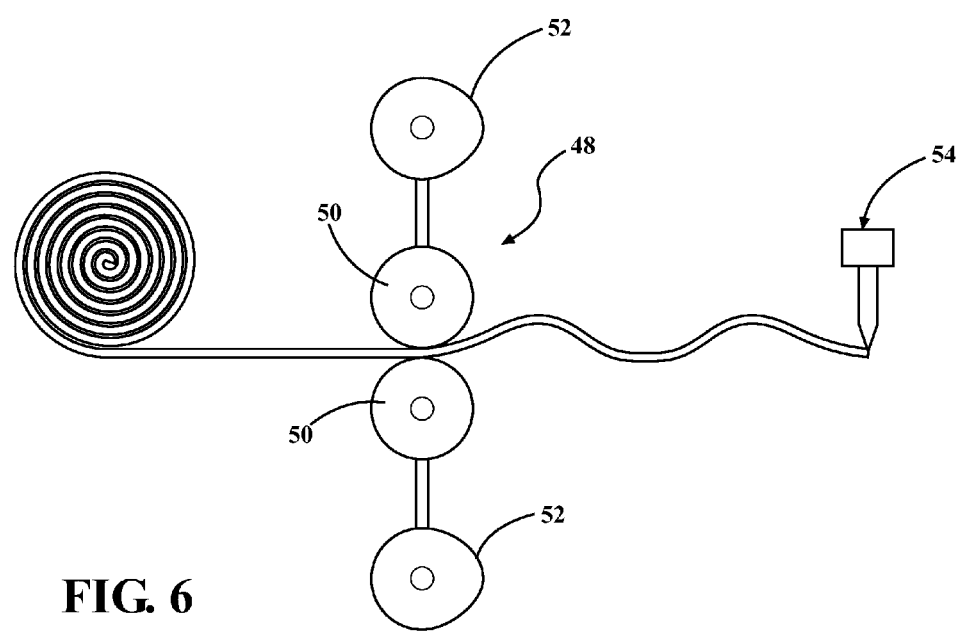
FIG. 6 is a schematic view of a setup for making a carrier element for a wiper blade assembly.

Referring now to FIG. 6, a set up for making an M-shaped carrier element 28 is generally shown. As shown, the set up includes a roller assembly 48 including at least one pair of rollers 50 biased towards one another. A strip of a deflectable and spring-like material, such as spring steel, is fed between the rollers 50. Each roller 50 is operatively coupled to a non-circular cam 52 for varying the pressure applied by the rollers 50 against the wiper strip 22. Varying the pressures applied by the rollers 50 has the effect of deforming the material of the strip in such a way that the strip exits the roller assembly 48 with a curvature. For example, increasing the pressure applied by one of the rollers 50 may give the strip a downwardly facing curvature and increasing the pressure applied by the other roller 50 may give the strip an upwardly facing curvature. A cutting mechanism 54 is disposed adjacent the roller assembly 48 for cutting the strip into predetermined lengths. This process has been found to be very quick and cost effective. However, it should be appreciated that the carrier element 28 could be curved through a range of different rolling or bending processes.

Another aspect of the present invention is a method of making a windscreen wiper device. The method includes the step of preparing at least one flexible and elongated carrier element 28. The carrier element 28 is preferably formed of a spring-like material, such as spring steel. The method continues with the steps of plastically deforming the at least one carrier element 28 to give it at least one upwardly facing curve 46 and at least one downwardly facing curve 44 when in a relaxed state. The deforming process is preferably with a roller assembly 48 including a plurality of rollers 50 that are biased against the carrier element 28 with a variable force as the carrier element 28 is fed therebetween. The method continues with the step of engaging the at least one carrier element 28 with a wiper strip 22 to bias the wiper strip 22 into a configuration having at least one upwardly facing curve 46 and at least one downwardly facing curve 44.

Obviously, many modifications and variations of the present invention are possible in light of the above teachings and may be practiced otherwise than as specifically described while within the scope of the appended claims.

What is claimed is:

1. A windscreen wiper device for cleaning a windshield of a vehicle, comprising:
    a frame structure including a main bridge and a pair of end piece sub-assemblies;
    said main bridge having side walls which are spoiler shaped for creating a down-force when the vehicle is travelling at speed and which extend to a bottom of said main bridge and said main bridge presenting an opening between said side walls;
    an elongated wiper strip of a flexible material for sealing against the windshield and having at least one elongated groove and having a top surface;
    at least one flexible and elongated carrier element disposed in said at least one groove of said elongated wiper strip for biasing said elongated wiper strip into a predetermined configuration when in a relaxed state;
    wherein said at least one carrier element is pre-shaped to present a pair of downwardly facing curves separated from one another by a single upwardly facing curve such that said predetermined configuration of said wiper element when said carrier element is in said relaxed state is generally M-shaped and such that said top surface of said wiper element in a region of said upwardly facing curve is spaced from said bottom of said main bridge by an open gap between said main bridge and said wiper element; and
    wherein said top surface of said wiper element in said region of said upwardly facing curve is disposed in said opening between said side walls of said main bridge when said wiper element is in ready-to-wipe configuration such that no gap exists between said main bridge and said wiper element when said wiper element is in said ready-to-wipe configuration.

2. The windscreen wiper device as set forth in claim 1 wherein said at least one elongated groove on said elongated wiper strip is further defined as a pair of elongated grooves and wherein said at least one carrier element is further defined as a pair of carrier elements.

3. The windscreen wiper device as set forth in claim 1 wherein each of said end piece sub-assemblies includes at least two of said sets of claws that are in engagement with said carrier element at locations approximately between said upwardly facing and said downwardly facing curves.

* * * * *